United States Patent [19]
Astle

[11] Patent Number: 5,365,552
[45] Date of Patent: Nov. 15, 1994

[54] BUFFER FULLNESS INDICATOR

[75] Inventor: Brian Astle, Cranbury, N.J.

[73] Assignee: Intel Corporation, Santa Clara, Calif.

[21] Appl. No.: 977,501

[22] Filed: Nov. 16, 1992

[51] Int. Cl.$^5$ ............................................. H04L 7/00
[52] U.S. Cl. ................................... 375/106; 375/118; 375/121
[58] Field of Search ............... 375/118, 121, 122, 106; 370/105.3, 102; 358/133, 136; 381/29–31

[56] References Cited

U.S. PATENT DOCUMENTS

| | | | |
|---|---|---|---|
| 4,302,775 | 11/1981 | Widergren et al. | 358/136 |
| 4,704,628 | 11/1987 | Chen et al. | 358/136 |
| 5,134,477 | 7/1992 | Knauer et al. | 358/136 |
| 5,263,057 | 11/1993 | Nawrocki et al. | 375/118 |

*Primary Examiner*—Tesfaldet Bocure
*Attorney, Agent, or Firm*—William H. Murray; James H. Dautremont

[57] ABSTRACT

The inventive method for indicating the level of buffer fullness of a data receiving device may be applied to editing processes and to general synchronization problems including problems involving clocks running at different speeds. The method of the present invention includes embedding into a transmitted bit stream a signal representing the fullness of the buffer of the receiving device, as calculated by the transmitting device. Thus, the bit stream received by the receiving device periodically includes a signal that indicates how full the transmitter model predicts the receiving buffer is. The receiving device applies a model decoder algorithm to the received bit stream and determines how full the buffer should be at different points for comparison with the periodic indicators.

21 Claims, 3 Drawing Sheets

BUFFER FULLNESS INDICATOR

BACKGROUND OF THE INVENTION

1) Field of the Invention

This invention relates to the field of data communications systems and in particular to synchronizing received data signals within data communications systems.

2) Background of the Invention

The problem of synchronizing received signals in data communications systems is well known in the art. For example, in the case of video communications one commonly known result of this problem is difficulty in maintaining synchronization between the audio and video portions of the recorded signals over long periods of time. It is common to record the video signal nominally at thirty hertz prior to transmission in these systems. The clock of the recording device may be very precise and the signal may be recorded substantially correctly prior to transmission. At some later time a receiving device with a different clock may receive the recorded and transmitted signal. The receiving device may also have a clock which is quite accurate, also nominally thirty hertz. However, if the two clocks are even slightly different, as they often are in practice, synchronization problems may result. It will be understood that a difference on the order of one part in several million between the two clocks may be enough to cause loss of synchronization.

Loss of synchronization in this type of system may occur in different ways. As an example consider first the case in which the clock of the receiving device is slightly slower than the clock of the transmitting device. Typically in these systems the receiver buffer size is known at the transmitting end during transmission of the signals. The size of the receiver buffer determines how much data the receiver can store without overflowing. The receiver buffer is emptied by the receiver as it uses recorded data at a rate depending on its own internal clock. When the transmitter clock is slightly faster than the receiver clock there will be a gradual buildup of data stored in the receiver buffer.

At some point, if the receiver clock continues to run slower, the receiver buffer overflows. This causes an unacceptable loss of data. For example, the receiver may eventually lose a frame of video data. This may cause a loss of audio and video synchronization. Moreover, the loss of synchronization may be cumulative.

The converse problem occurs when the receiver clock is slightly faster than the transmitter clock. A conventional way to start the transmission process is for the transmitter to transmit some data to the receiver and partially fill the receiver buffer. The receiver then provides a signal to the transmitter indicating that the process is beginning. When the receiver clock is slightly faster than the transmitter clock, the receiver empties the buffer faster than the transmitter fills it. This causes the receiver buffer to be empty at some point. At this point the receiver may unsuccessfully attempt to access data from the empty buffer for display and be unable to display the next frame of video. Under these circumstances the receiver executes some predetermined strategy such as repeating a previous frame. This again may lead to loss of synchronization between audio bit stream and the video bit stream.

A well known type of transmitter/receiver data communications system wherein these types of synchronization problems may occur is encoder/decoder systems. In some of these prior art encoder/decoder systems separate bit streams representing video and audio are encoded in sections called units. These units may be arranged more or less independently to allow editing of the encoded bit streams. Thus, the units may be marked in some way for an editing process and they may be deleted from one or more of the bit streams, rearranged, or added to the bit streams. In a manner similar to that described with respect to lack of synchronization of transmitter and receiver clocks, altering the time duration of portions of the transmitted bit streams by editing in this manner may also lead to loss of synchronization between the two bit streams.

Conventional encoder/decoder systems which permit editing may have predetermined limitations imposed upon them. For example some limitations may be imposed by standardization specifications. These imposed limitations may include the buffer size of the decoder and the constant rate at which data is transmitted from the encoder to the decoder. Under these conditions, it is known by the encoder at the time of encoding of a bit stream what the size of the decoder buffer within the receiving device is. If the clocks of the encoder and the decoder are perfectly synchronized, the decoder buffer may never overflow or underflow and synchronization between the bit streams may be maintained indefinitely. However, when editing is performed on one of the bit streams, synchronization problems may be introduced into the system. For example, if a few units are removed from the audio bit stream it may get ahead of the video bit stream.

SUMMARY OF THE INVENTION

The inventive method for indicating the level of buffer fullness of a data receiving device may be applied to editing processes and to general synchronization problems including problems involving clocks running at different speeds. The method of the present invention includes embedding into a transmitted bit stream a signal representing the fullness of the buffer of the receiving device, as calculated by the transmitting device. Thus, the bit stream received by the receiving device periodically includes a signal that indicates how full the transmitter model predicts the receiving buffer is. The receiving device applies a model decoder algorithm to the received bit stream and determines how full the buffer should be at different points for comparison with the periodic indicators.

DETAILED DESCRIPTION OF THE INVENTION

Figure 1:
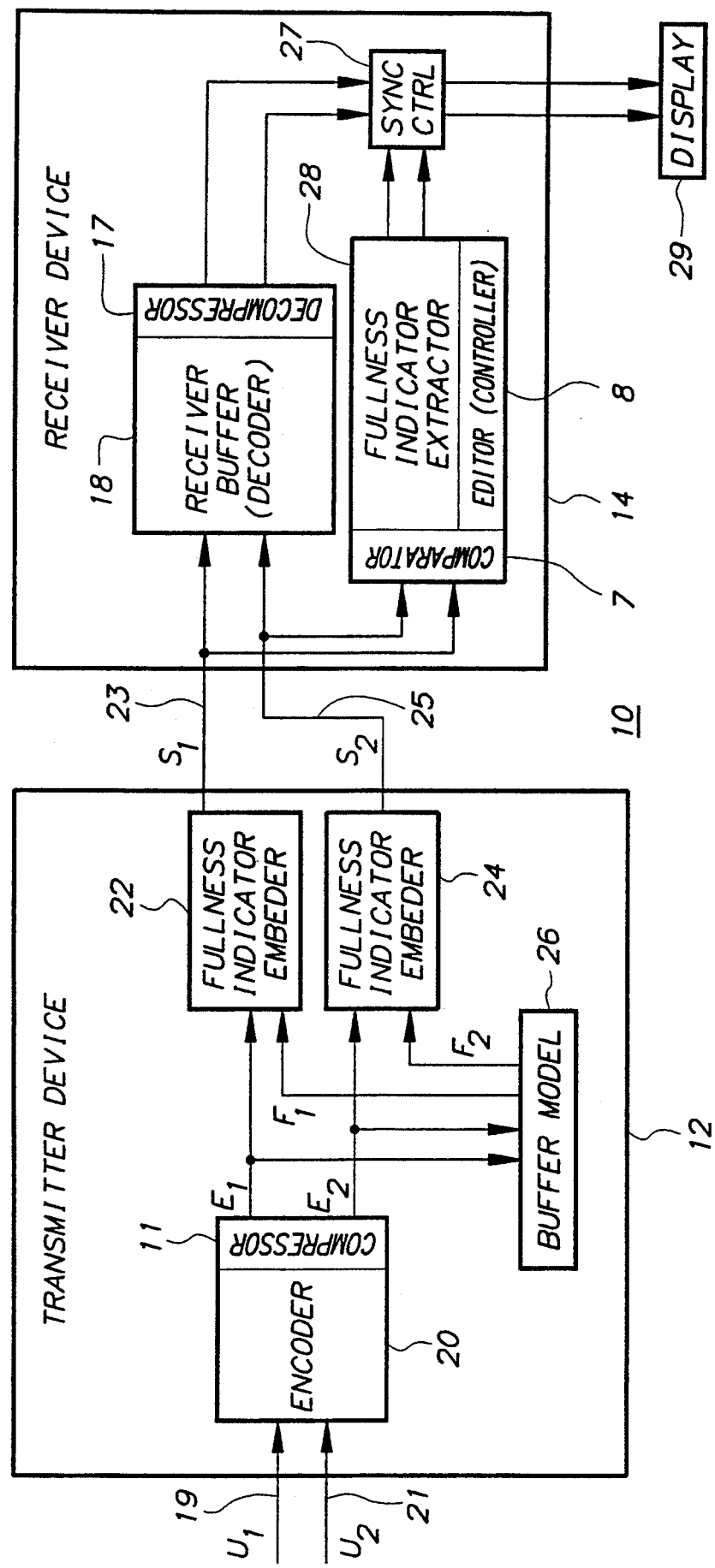
FIG. 1 shows a block diagram representation of the buffer usage indicator system of the present invention.

Referring now to FIG. 1, there is shown buffer fullness indicator system 10 of the present invention. Buffer fullness indicator system 10 is adapted to transmit two signals $S_1$ and $S_2$ from transmitter device 12 to receiver device 14 and permit receiver device 14 to maintain synchronization with signals $S_1$, and $S_2$. More particularly, buffer fullness indicator system 10 is adapted to permit receiver device 14 to maintain synchronization between received signals $S_1$ and $S_2$.

Receiver device 14 may, for example, be a video processor decoder 14 adapted for receiving, decoding, and displaying video signals and associated audio signals. In particular decoder 14 may be adapted to decompress video data which was compressed by data compression device 11 to permit more efficient transmission of the video signals. Receiver device 14 of buffer fullness indicator system 10 is provided with receiver buffer 18 for receiving and storing signals $S_1$ and $S_2$ from transmitter device 12 for later use in any conventional manner. A typical later use of signals $S_1$ and $S_2$ may, for example, be the display of images on display device 29 and the reproduction of audio as the image and audio are represented by signals $S_1$ and $S_2$. When these signals are used by receiver device 14, they are retrieved from receiver buffer 18 (including decompression means 17) and any loss of synchronization between signals $S_1$ and $S_2$ occurring prior to their use is compensated by synchronization block 27 including means for synchronizing the signals $S_1$ and $S_2$ with each other in accordance with the receiver buffer fullness indicator, which means for synchronizing includes means for adjusting the clock rate of the receiver in accordance with the relative actual fullness of the receiver buffer within system 10 of the present invention.

Transmitter device 12 of buffer fullness indicator system 10 is provided with conventional signal encoder 20 which receives unencoded signals $U_1$ and $U_2$ by way of transmitter input lines 19, 21. Signal encoder 20 of transmitter device 20 encodes signals $U_1$ and $U_2$ to provide two encoded signals, $E_1$ and $E_2$. An example of the type of signal encoder 20 which may be provided within receiver device 12 is an encoder device (including compression means 11) to compress digital bit streams.

Encoded compressed signals $E_1$ and $E_2$ from encoder 20 are applied to transmitter buffer model 26 within transmitter device 12. Buffer model 26 may include a conventional buffer fullness algorithm wherein the size of receiver buffer 18 is known and, in accordance with encoded signals $E_1$ and $E_2$, a calculation is performed to determine predicted the level of fullness of receiver buffer 18. The level of fullness of receiver buffer 18 calculated in this manner by buffer model 26 is used within transmitter device 12 to predict the actual fullness of receiver buffer 18 encoded when data is transmitted to receiver device 14.

Buffer model 26 within transmitter device 12 then provides the calculated buffer fullness indicators $F_1$ and $F_2$ corresponding to encoded signals $E_1$ and $E_2$. Thus buffer fullness indicators $F_1$ and $F_2$ are representative of the level of fullness of receiver buffer 18 as calculated by the algorithm within buffer model 26. When buffer fullness indicators $F_1$ and $F_2$ are thus determined by the algorithm buffer model 26 in accordance with the buffer fullness algorithm, they are applied to buffer fullness indicator embedders 22, 24.

It will be understood by those skilled in the art that methods for calculating the fullness of decoder buffer 18, such as those performed within transmitter device 12, are well known in the art for cases in which decoder device 14 empties buffer 18 according to known prior art decoding techniques. Thus it will be understood that both transmitter device 12 and receiver device 18 (including decompression means 17) must agree with respect to buffer model 26. Decoder device 14 need not follow buffer model 26, but it must recognize that any deviations from buffer model 26 must be compensated in order to maintain synchronization. For example, if receiver device 14 empties decoder buffer 18 faster than buffer model 26 predicts, it may be required to provide delays so that receiver buffer 18 does not underflow. If decoder device 14 decodes at wider variations than the variations allowed for in buffer model 26, it may be required to provide a larger size receiver buffer 18.

In addition to receiving buffer fullness indicators $F_1$ and $F_2$ from buffer model 26, buffer fullness indicator embedders 22, 24 of transmitter device 12 also receive encoded signals $E_1$ and $E_2$ from signal encoder 20. Buffer fullness indicator embedder 22 embeds buffer fullness indicator $F_1$ received from model 26 into encoded signal $E_1$. This embedding operation generates signal $S_1$ for transmission to receiver device 14 by way of channel 23.

Thus transmitted signal $S_1$ includes both encoded signal $E_1$ from signal encoder 20 and an indicator $F_1$ representative of the fullness of receiver buffer 18 as calculated by buffer model 26. The indicator $F_1$ of the fullness of receiver buffer 18 is intended to be accurate at the time when receiver device 14 uses transmitted signal $S_1$, at a time after buffer model 26 calculates indicator $F_1$.

In a similar manner, buffer fullness indicator embedder 24 embeds buffer fullness indicator $F_2$ received from buffer model 26 into encoded signal $E_2$. This embedding operation generates transmitted signal $S_2$ for transmission to receiver device 14 by way of channel 25. Thus transmitted signal $S_2$ includes both encoded signal $E_2$ and indicator $F_2$ representative of the fullness of receiver buffer 18 as calculated with the buffer fullness algorithm within buffer model 26. This indication of buffer fullness is intended to be accurate at the time when receiver device 14 uses transmitted signal $S_2$.

There are many ways known to those skilled in the art of signal processing for buffer fullness indicator embedders 22, 24 to embed indicators such as buffer fullness indicators $F_1$ and $F_2$ of the present invention into bit streams $E_1$ and $E_2$ to provide transmitted signals $S_1$ and $S_2$. It will be understood by those skilled in the art that buffer fullness indicator embedders 22, 26 may be shift registers or any other hardware device suitable for inserting bytes of data into a bit stream such as the encoded bit streams $E_1$ and $E_2$.

Alternately, embedders 22, 24 may be a processor device (not shown) operating upon a program adapted to cause the processor device to embed indicators $F_1$ and $F_2$ into the bit stream prior to transmission. In a similar manner it will be understood that there are many ways for buffer fullness indicator extractor 28 to extract buffer fullness indicators $F_1$ and $F_2$ from transmitted signals $S_1$ and $S_2$. For example, extractor 28 for extracting indicators $F_1$ and $F_2$ from bit streams $S_1$ and $S_2$ may include shift registers or a programmed processor device or a comparator device 7.

It is believed that a high degree of precision is not necessary when determining $F_1$ and $F_2$ for indicating the level of fullness of receiver buffer 18 in this manner. For example, in a conventional bit stream, a single byte may be periodically inserted in either a frame header or in a group of frame headers by fullness indicator embedders 22, 24. It will be understood by those skilled in the art that a predetermined syntax may be required to define this inserted byte and that the inserted byte may, for example, represent the fullness of receiver buffer 18 in fractions of two hundred fifty five if buffer fullness indicators $F_1$ and $F_2$ are represented with a single eight bit byte each.

Thus, for example, a buffer fullness indicator byte inserted or embedded into encoded signals $E_1$ and $E_2$ may contain eight bits. This permits indicators $F_1$ and $F_2$ to have values between zero and two hundred fifty five. An embedded value of zero may indicate that receiver buffer 18 of receiver device 14 is determined to be empty by buffer model 26 of transmitter device 26. An embedded value of two hundred fifty five may indicate that receiver buffer 18 is determined to be full. An embedded buffer fullness indicator $F_1$ or $F_2$ of one hundred twenty seven may indicate that receiver buffer 18 is approximately half full.

As previously described, it is not believed that great precision is required in indicating the fullness of receiver buffer 18 by buffer model 26 within transmitter device 12. Thus in some applications it may be possible to use even fewer than eight bits to represent the fullness of receiver buffer 18 within buffer fullness indicator system 10. Furthermore, it may be possible to restrict the range of the values of buffer fullness indicators $F_1$ and $F_2$ to values less than the maximum which may be represented by the allocated number of bits in the indicator.

For example, fullness indicators $F_1$ and $F_2$ may be limited to values between zero and one hundred. This limited range may be provided with a seven bit indicator value. A fullness indicator value of a fifty may then indicate that receiver buffer 18 in this example is half full. An embedded indicator value of zero may indicate that receiver buffer 18 is empty as previously described. This range of values of indicators $F_1$ and $F_2$ provides an accuracy to within one percent, which is believed to be adequate for many applications.

Thus transmitted signal $S_1$ provided by transmitter device 12 by way of transmission channel 23 includes both (1) the encoded signal $E_1$ from signal encoder 20, and (2) a calculated indicator $F_1$ representative of the level of fullness expected within receiver buffer 18 according to encoded signal $E_1$ and the buffer model algorithm of buffer model 26. Likewise, buffer fullness indicator embedder 24 embeds buffer fullness indicator $F_2$ into encoded signal $E_2$ to provide a signal $S_2$ for transmission to receiver device 14 by way of transmission channel 25. Thus signal $S_2$ includes (1) the encoded signal $E_2$ from signal encoder 20, and (2) a calculated indicator $F_2$ representative of the predicted level of fullness of receiver buffer 18 in accordance with encoder signal $E_2$ and buffer fullness model 26.

Figure 2:
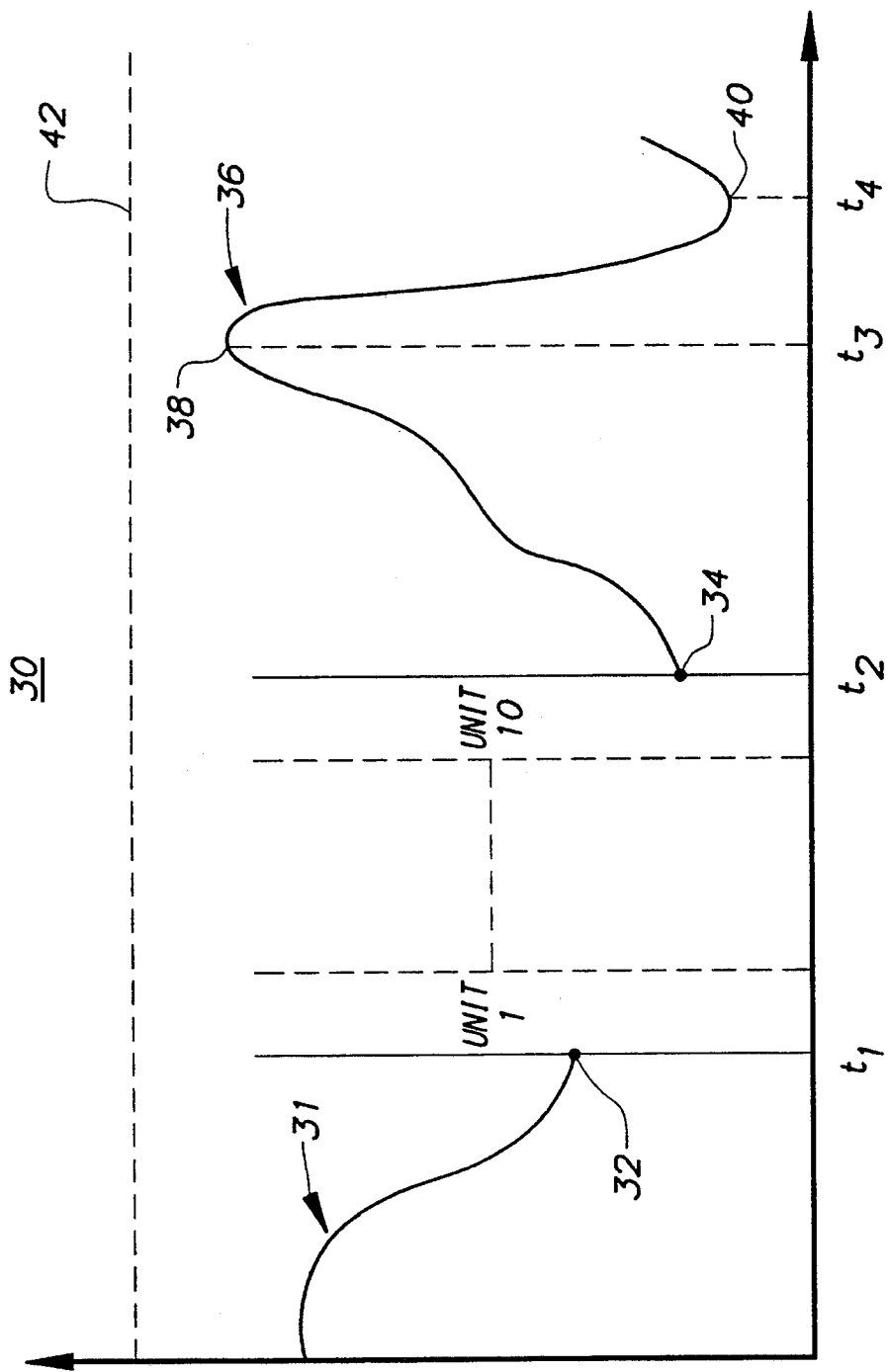
FIGS. 2 and 3 show graphical representations of the fullness of a receiver buffer within the buffer usage indicator system of FIG. 1.

Referring now to FIG. 2, there is shown graphical representation 30 of the fullness of receiver buffer 18 for an arbitrary bit stream within receiver device 14 of buffer fullness indicator system 10 of the present invention. The horizontal axis of graphical representation 30 indicates time and the vertical axis indicates the theoretical fullness of receiver buffer 18 as bit streams $S_1$ and $S_2$ are applied to receiver device 14 by transmitter device 12. This theoretical fullness of receiver buffer 18 may be determined, for example, by a buffer fullness algorithm such as the algorithm used by buffer model 26 of transmitter device 12.

A buffer fullness level above buffer overflow level 42 within graphical representation 30 indicates that receiver buffer 18 of receiver 14 is overflowing. It will be noted that at time $t_3$ receiver buffer 18 is somewhat close to being full but does not actually overflow because buffer fullness level 38 at time $t_3$ is still below buffer overflow level 42. Likewise it will be noted that buffer fullness level 40 at time $t_4$ does not cause underflow because fullness level 40 is still above zero on the vertical axis of graphical representation 30.

Using a buffer fullness algorithm such as the algorithm of buffer model 26 to provide graphical representation 30, buffer fullness indicator system 10 predicts decoder buffer fullness level 32 at time $t_1$ at the end of waveform portion 31. An editing process done by editor means 8 may then be performed by a user of system 10 which deletes a set of units from a transmitted bit stream beginning at time $t_1$. For example, editing may delete ten units (not shown) extending from unit 1, beginning at time $t_1$ at the end of waveform portion 31, to unit 10, ending at time $t_2$ at the beginning of waveform portion 36. Buffer model 26 of transmitter device 12 predicts that encoder buffer 18 has buffer fullness level 34 at the end of unit 10. Waveform portion 36, beginning at time $t_2$ where deleted unit 10 ends, may be of any duration.

Figure 3:
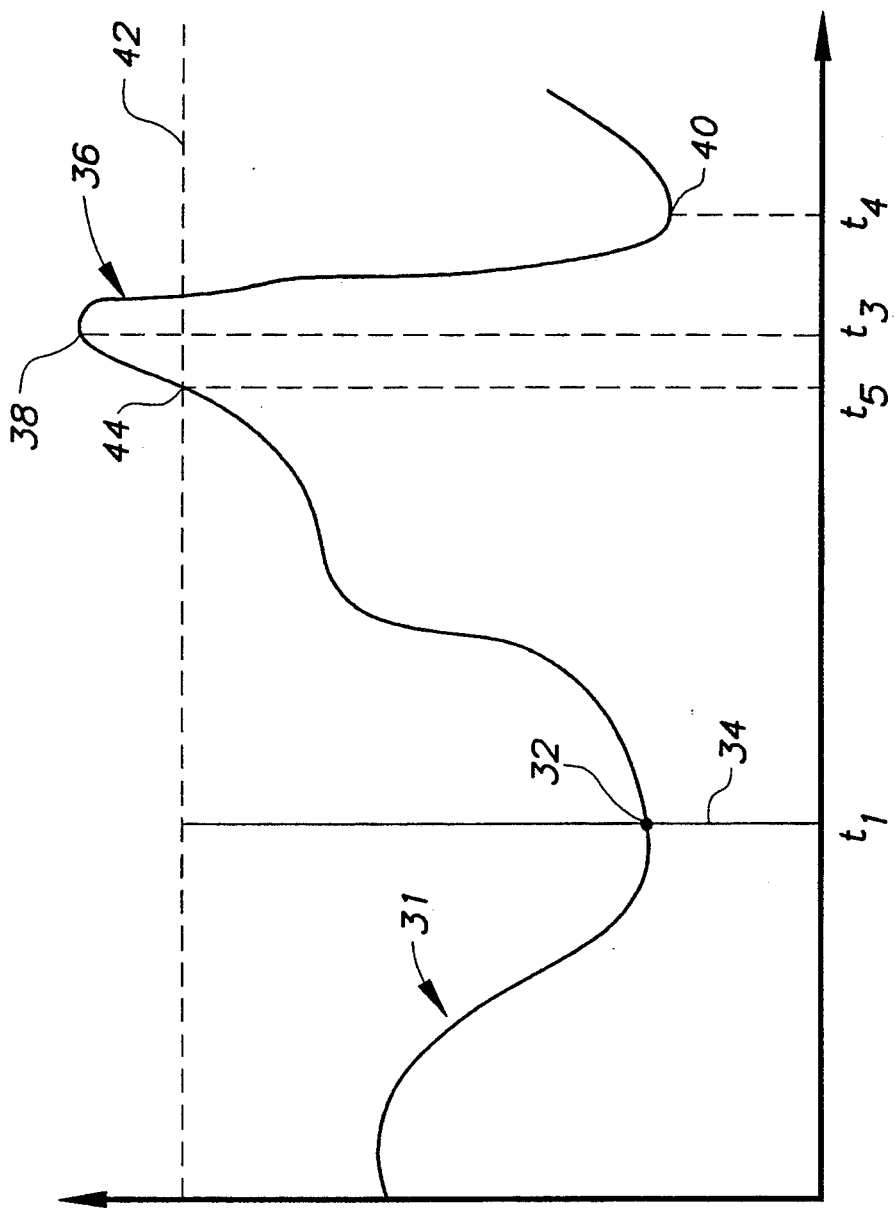

Referring now to FIG. 3, there is shown graphical representation 50 of the fullness of decoder buffer 18 within receiver buffer 18 of buffer fullness indicator 10 of the present invention. Graphical representation 50 indicates the buffer fullness level of decoder buffer 18 after a conventional editing process is used to delete unit 1 through unit 10 of graphical representation 30. After units 1 through 10 are deleted waveform portion 36 is joined to waveform portion 31 at time $t_1$.

In graphical representation 50 waveform portion 36 is shifted upward prior to being joined to waveform portion 31. This must be done in order to bring the buffer fullness at the beginning of waveform portion 36 from it previous level, buffer fullness level 34, to the level of buffer fullness level 32. As previously described, buffer fullness level 32 is the fullness of receiver buffer 18 where deletion of unit 1 began at the end of waveform portion 31. As shown, in graphical representation 50 waveform portion 36 is shifted forward in time in order for waveform portions 31, 36 to be joined at time $t_1$. It will be understood by those skilled in the art that the beginning of waveform portion 36 and the end of waveform portion 31 must be at the same time and the same level within the calculations of buffer model 26.

Waveform portion 36 of graphical representation 50, after being joined to waveform portion 31, is the same shape as it was in graphical representation 30. It is merely translated with respect to both axes. Under these circumstances, in a conventional data transmission system, overflow of decoder buffer 18 may occur at time $t_5$ where actual buffer fullness level 44 begins to exceed overflow fullness level 42.

This overflow of receiver buffer 18 may occur for the following reasons. At time $t_1$ the fullness of decoder buffer 18 is represented as buffer fullness level 32 of both graphical representation 30 and graphical representation 50. However, transmitter device 12, in following the buffer fullness algorithm of buffer model 26, assumes during subsequent encoding and transmitting that the level of fullness of decoder buffer 18 is only at fullness level 34 of graphical representation 30. It will be understood by those skilled in the art that a similar process may cause an underflow of decoder buffer 18 if waveform portion 36 must be translated downward in order to join with waveform portion 31 at time $t_1$. Such an underflow of buffer decoder 18 may occur at some time before time $t_4$ of buffer fullness level 40.

Thus, in general, if buffer fullness level 34 at time $t_2$ at the beginning of waveform portion 36 represents a higher level of data stored in receiver buffer 18 than the level of data stored at time $t_1$, then the removal of units 1 through 10 may eventually lead to an underflow. If fullness level 34 represents a lower level of data stored in receiver buffer 18 than the data stored at time $t_1$, eventually there may be an overflow of receiver buffer 18 at some time prior to time $t_3$, at some time shortly before the level of decoder buffer 18 reaches overflow fullness level 42.

In order to perform editing of transmitted signals $S_1$ and $S_2$, a user of buffer fullness indicator system 10 may determine, for example, the fullness of receiver buffer 18 at time $t_1$, using graphical representation 30. The fullness may be determined either: (1) according to a buffer fullness indicator $F_1$ at or around time $t_1$ indicating the buffer fullness represented by level 32, or (2) by determining a fullness level at some point in the data stream prior to time $t_1$ and applying a decoder algorithm to the bit stream into buffer 18 to arrive at a calculation of buffer fullness at time $t_1$. In the case of graphical representation 50 the system could determine that the level after time $t_1$ was around level 32 and not level 34 and avoid the overflow condition.

It will be understood by those skilled in the art that buffer fullness indicator system 10 of the present invention may be applied advantageously to signals $S_1$ and $S_2$ not only when editing of the bit streams is performed. System 10 may also be applied to bit streams wherein the receiving and transmitting devices are driven by different clocks which are not running at exactly same rate thereby causing a cumulative timing difference between the two devices. Additionally, system 10 may be applied to any system wherein signals $S_1$ and $S_2$ may require synchronization. In any of these cases, synchronization control 27 is effective to synchronize receiver device 14 with a transmitted signal, to synchronize transmitted signal, with each other, or to perform any other synchronization tasks which are known to those skilled in the art. For example synchronization control may modify the dock rates of devices 12, 14 or pad bit streams or delete portions of bit streams.

It should be understood that the foregoing description and drawings of the invention are not intended to be limiting, but are only exemplary of the invented features which are defined in the claims.

I claim:

1. A communication system having a transmitter device and a receiver device, said transmitter device having a transmitter buffer for partially filling a receiver buffer to an actual receiver buffer fullness level, comprising:

means for determining a buffer fullness indicator representative of the predicted level of fullness of said receiver buffer in accordance with a first signal;

indicator embedder means for embedding said buffer fullness indicator into said first signal to form a second signal;

said transmitter device having means for transmitting said second signal including said embedded buffer fullness indicator;

said receiver device having means for receiving said transmitted signal and recovering said buffer fullness indicator from said transmitted second signal; and, means for determining a fullness level of said receiver buffer in accordance with said recovered buffer fullness indicator.

2. The communication system of claim 1, further comprising means for comparing said recovered buffer fullness indicator with said actual buffer fullness level of said receiver buffer.

3. The communication system of claim 2, further comprising means for controlling said actual buffer fullness level in accordance with said recovered buffer fullness indicator.

4. The communication system of claim 3, wherein said controlling means comprises means for controlling said actual buffer fullness level in accordance with said means for comparing.

5. The communication system of claim 1, further comprising means for synchronizing said receiver device with said transmitted second signal in accordance with said recovered buffer fullness indicator.

6. The communication system of claim 1, wherein said transmitter and receiver devices have differing clock rates further comprising synchronization control means in said receiver for adjusting said receiver clock rate in accordance with said recovered buffer fullness indicator.

7. The communication system of claim 6, wherein said means for adjusting comprises means for adjusting said clock rate of said receiver device.

8. The communications system of claim 1, including editing means for editing at least one of said first and second signals thereby causing editing loss of synchronization, said system further comprising synchronization means for compensating said editing loss of synchronization in accordance with said recovered buffer fullness indicator.

9. The communication system of claim 1, wherein said transmitter device and receiver device include means for transmitting and receiving a plurality of signals further comprising synchronization means for synchronizing said plurality of signals with each other in accordance with said recovered buffer fullness indicator.

10. The communication system of claim 1, wherein said means for determining said buffer fullness indicator representative of the level of fullness of said receiver buffer comprises a buffer model representative of said receiver buffer.

11. The communication system of claim 1, wherein said transmitter device and said receiver device comprise an encoder device and a decoder device respectively.

12. The communication system of claim 11, wherein said encoder and decoder devices represent a data compression device and a data decompression device respectively.

13. The communication system of claim 1, wherein said indication embedding means comprises a shift register.

14. In a communication system having a transmitter device and a receiver device, said receiver device having a receiver buffer for filling said buffer to an actual buffer fullness level, a synchronization method comprising the steps of:

(a) determining a buffer fullness indicator representative of the level of fullness of said receiver buffer in accordance with a first signal;

(b) embedding said buffer fullness indicator into said first signal to form a second signal;

(c) transmitting said second signal by said transmitter device, said transmitted second signal including said embedded buffer fullness indicator;

(d) receiving said transmitted signal by said receiver device, and recovering said buffer fullness indicator from said transmitted second signal; and, (e) determining a fullness level of said receiver buffer in accordance with said recovered buffer fullness indicator.

15. The synchronization method of claim 14, comprising a further step of comparing said recovered buffer fullness indicator with said actual buffer fullness level of said receiver buffer.

16. The synchronization method of claim 14, comprising a further step of controlling said actual buffer fullness level in accordance with said recovered buffer fullness indicator.

17. The synchronization method of claim 15, comprising a further step of controlling said actual buffer fullness level in accordance with said comparing.

18. The synchronization method of claim 16, wherein said transmitter and receiver devices have differing clock rates and the step of controlling comprises adjusting at least one of said clock rates in accordance with said recovered buffer fullness indicator.

19. The synchronization method of claim 14, comprising a further step of editing said transmitted second signal thereby causing editing loss of synchronization and compensating for said editing loss of synchronization in accordance with said recovered buffer fullness indicator.

20. The communication method of claim 14, wherein said transmitter device and receiver device include means for transmitting and receiving a plurality of signals further comprising the step of synchronizing said plurality of signals with each other in accordance with said recovered buffer fullness indicator.

21. The communication method of claim 14, wherein said embedding step is performed by a shift register.

* * * * *